(12) United States Patent
Levenshteyn et al.

(10) Patent No.: US 8,787,267 B2
(45) Date of Patent: Jul. 22, 2014

(54) TECHNIQUE FOR PROVIDING ACCESS TO A MEDIA RESOURCE ATTACHED TO A NETWORK-REGISTERED DEVICE

(75) Inventors: Roman Levenshteyn, Aachen (DE); Ioannis Fikouras, Aachen (DE); Göran Eriksson, Norrtälje (CH)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 1181 days.

(21) Appl. No.: 12/306,463

(22) PCT Filed: Jun. 30, 2006

(86) PCT No.: PCT/EP2006/006381
§ 371 (c)(1),
(2), (4) Date: Sep. 24, 2009

(87) PCT Pub. No.: WO2008/000291
PCT Pub. Date: Jan. 3, 2008

(65) Prior Publication Data
US 2010/0061316 A1    Mar. 11, 2010

(51) Int. Cl.
*H04W 4/00* (2009.01)
*H04L 29/06* (2006.01)

(52) U.S. Cl.
CPC .......... *H04L 65/80* (2013.01); *H04L 29/06027* (2013.01)
USPC .......................................... 370/329

(58) Field of Classification Search
CPC .................. H04L 65/80; H04L 29/06027
USPC .......................................... 370/329
See application file for complete search history.

(56) References Cited

U.S. PATENT DOCUMENTS

| 6,885,861 B2 * | 4/2005 | Koskelainen | 455/414.2 |
| 2004/0172481 A1 * | 9/2004 | Engstrom | 709/239 |
| 2005/0153741 A1 * | 7/2005 | Chen et al. | 455/558 |
| 2005/0221825 A1 * | 10/2005 | Osugi | 455/436 |
| 2006/0019652 A1 * | 1/2006 | Itabashi | 455/425 |

FOREIGN PATENT DOCUMENTS

WO    WO 03/049381 A    6/2003

* cited by examiner

*Primary Examiner* — Asad Nawaz
*Assistant Examiner* — Saad A Waqas

(57) ABSTRACT

A technique for accessing a media resource (114) controllably attachable to a network-registered device (104) via a multimedia-enabled network (102) is proposed. The technique comprises determining a resource capability information indicating a capability of the media resource; transforming the resource capability information into service capability information indicating a capability related to a service accessible at the network-registered device via the network; and providing the service capability information to an access-requesting entity (106).

8 Claims, 13 Drawing Sheets

| ASI | | | ASD | | |
|---|---|---|---|---|---|
| URI | SCI | LSI | ARA | RCI | ... |
| sip:node1@... | sip.video | LSI1 | 192.168.1.100 | ->OH1... | ... |
| sip:node1@... | sip.video | LSI2 | 192.168.1.123 | ->OH2... | ... |
| sip:node1@... | sip.audio | LSI3 | 00:20:DF:E0:A3:5A | ->OH3... | ... |

| ASI | | | Other data |
|---|---|---|---|
| URI | SCI | LSI | |
| sip:node1@... | sip.video | LSI1 | ... |
| sip:node1@... | sip.audio | LSI2 | ... |

```
REGISTER sip:example.com SIP/2.0
From: sip:user@example.com;tag=asd98
To: sip:user@example.com
Call-ID: hh89as0d-asd88jkk@host.example.com
CSeq: 9987 REGISTER
Max-Forwards: 70
Via: SIP/2.0/UDP host.example.com;branch=z9hG4bKnashds8
Contact: <sip:user@host.example.com>;audio;video
   ;actor="msg-taker";automata;mobility="fixed"
   ;methods="INVITE,BYE,OPTIONS,ACK,CANCEL"
Content-Length: 0
```
↖ 1102

```
REGISTER sip:example.com SIP/2.0
From: sip:user@example.com;tag=asd98
To: sip:user@example.com
Call-ID: hh89as0d-asd88jkk@host.example.com
CSeq: 9987 REGISTER
Max-Forwards: 70
Via: SIP/2.0/UDP host.example.com;branch=z9hG4bKnashds8
Contact:
<sip:user@host.example.com>;audio=LSI3;video=LSI1
   ;video=LSI2;actor="msg-taker"
   ;automata;mobility="fixed"
   ;methods="INVITE,BYE,OPTIONS,ACK,CANCEL"
Content-Length: 0
```
↖ 1112

```
INVITE sip:service.provider@example.com SIP/2.0
Via: SIP/2.0/UDP
[5555::aaa:bbb:ccc:ddd];branch=z9hG4Knashds7
Max-Forwards: 70
Route: <sip:pcscf1.visited1.net;lr>,
<sip:scscf1.home1.net;lr>
From: <sip:invocer@example.com>;tag=171828
To: <sip:service.provider@example.com>
Call-ID: cb03a0s09a2sdfglkj490333
CSeq: 127 INVITE
Contact: <sip:[5555::aaa:bbb:ccc:ddd]>
Accept-Contact : audio;video=LSI1
Content-Type: application/sdp
Content-Length: 248
```

TECHNIQUE FOR PROVIDING ACCESS TO A MEDIA RESOURCE ATTACHED TO A NETWORK-REGISTERED DEVICE

FIELD OF THE INVENTION

The invention relates generally to the field of multimedia services provided by multimedia-enabled networks to devices, for example user devices. More specifically, the invention relates to a technique for accessing a media resource controllably attachable to a network-registered device from a multimedia-enabled network.

BACKGROUND OF THE INVENTION

The IMS (IP Multimedia Subsystem) of $3^{rd}$ generation mobile networks provides a variety of services to the connected devices. The services comprise the control and provision of media data of various types, for example audio data, video data, a combination of audio and video data (e.g., for video telephony), text data, application data, etc.

The IMS is thus a prominent example for a multimedia-enabled network (the Internet is another example of a multimedia-enabled network). The control of the services requires appropriate signalling mechanisms to ensure proper end-to-end transport of the media data. The IMS utilizes the SIP (Session Initiation Protocol) for these purposes. Within the SIP framework, user agents act on behalf of their users. User agents initiate requests and may usually be their final destination. Typically, but not exclusively, a user agent is a piece of software implemented on the user equipment or one of the user devices of the user. IP (Internet Protocol)-Phones or conferencing software are examples of user agents which may be implemented on mobile phones, smartphones, but also notebooks and other user terminals, user devices or items of user equipment enabled for communication over a network.

The principal role of SIP is to set up sessions or associations between at least two service-terminating devices, for example user devices but also server systems. Once a session is established, media data may be exchanged between the devices. For session establishment, session requests have to be routed through the network. To this end, SIP introduces a number of serving entities in the network, comprising a registrar server (including a location server), which keeps track of users after their registration in the network; a proxy server, forwarding as an application-layer router the SIP requests and responses; and/or a redirect server, receiving a request and returning a location of a SIP user agent or server where the requested user might be found. The media data of a session itself might be forwarded directly between the user agents. The serving entities may be part of or may be collocated to a CSCF (Call State Control Function) of the IMS domain.

Whereas the SIP protocol controls establishment and teardown of sessions, further protocols are required to, for example, accomplish the media data transport. The SDP (Session Description Protocol) and/or RTP (Real Time Protocol) or other protocols may be used for this purpose, which itself may make use of IP-UDP (User Datagram Protocol) communications or IP-TCP (Transmission Control Protocol) connections. Therefore, if not otherwise stated, the usage of the term 'SIP' herein is meant to denote the protocol suite of SIP for control of multimedia services and not only the SIP protocol itself.

Within the SIP framework, the addressing of another user, more precisely the addressing of one of the one or more items of user equipment of that user, may be achieved in different ways: as a first example, a SIP URI (Uniform Resource Identifier) of the user may be used which specifies an address in the format 'sip:user@network', the format structure being known from email-addresses. As a second example, an URI or URL (Uniform Resource Locator) may be used which is associated directly with a user device or user equipment of the user. Routing of service requests (service invocations) based on a user-related URI includes to resolve the user-related URI to the address associated to the correct UE of the user. This task may be performed with the help of a proxy server or redirect server.

A user agent of a device is the logical session endpoint for a service, i.e. the user agent terminates the service. For generating media data, the device has to comprise further hardware and/or software components, for example microphones or cameras for acquiring still and/or moving images, but also storage components which may, for example, be adapted for providing streaming media data (e.g. a DVD and a DVD drive providing a video stream). Still further, a media resource may also be the destination of a media stream, for example a storage device or storage component adapted for storing media data, e.g. a DVD-burning drive and/or the DVD adapted for insertion into the drive.

These media resources may have been integrated into the (user) device, which means that the user equipment has been adapted to access the integrated media resource and to provide the media data generated by the resource to the multimedia network. For example, the manufacturer of the user equipment may have configured a user agent specifically for controlling an integrated resource. Due to this specific adaptation of user equipment and integrated media resource, the capabilities of the integrated media resource may be announced to the network as capabilities of the user equipment.

Many user devices offer interfaces for attaching external hardware or software components or devices. For example, many mobile phones or notebooks offer one or more wireline or wireless interfaces of the following kinds: USB (Universal Serial Bus), Bluetooth, Serial or Fast-IR (Infrared), WLAN, FireWire, etc. These interfaces may be used to locally attach hardware devices, for example, home electronics (e.g., entertainment systems or home appliances), computing devices (e.g., personal computers), or mobile devices, which in turn may incorporate a camera, an IP phone, a media content player or similar devices. The device interfaces may also comprise interfaces for remote communication, for example IP-based communication, with a remote hardware, for example a remote computer, which may include a media resource.

If an interface for attaching external components is provided, the service-terminating equipment may also be adapted for controlling an attached media resource. For example, a mobile phone may be adapted to control an attached camera, such that the camera acquires a video sequence and sends the image to the phone. A user agent implemented in the mobile phone may then provide the acquired image to another device via an appropriate service of the network.

However, the attached media resource itself and its properties are not known in the network. For example, in an IMS network using the SIP protocol suite, a user agent may register on behalf of a user equipment in the network, announcing thereby the particular media-related capabilities of the UE. But there is no mechanism specified within the SIP framework to register an external media resource for the purpose of enabling access to it from or over the network. The SIP framework also provides for presence servers in the network as a possibility to announce UE capabilities for discovery by other UEs, see the 3GPP (3$^{rd}$ Generation Partnership Project) TS (Technical Specification) 23.141 and TS 24.841. The presence service, however, does not allow to announce capabilities of an attached media resource. Consequently, without a registration in the network, the resource cannot be accessed by other devices via the network. As an example, without registration, a discovery of capabilities offered by the attached media resources is not possible.

More and more mobile devices incorporate interfaces for WLAN (Wireless Local Access Networks) or similar techniques allowing to establish local ad-hoc networks for interconnecting several terminals with each other and further external media resources, wherein an access to a media resource attached to another UE may be possible. However, there is no possibility to date to connect from a multimedia network as IMS to such a local network and access the media resources.

The possibility to access media resources attached to a network-registered device via a network would thus add a diversity of use cases to the application field of multimedia networks. Accordingly, there is a need for a technique for providing access from an access-requesting entity via a multimedia-enabled network to a media resource controllably attachable to a network-registered device.

SUMMARY OF THE INVENTION

According to a first aspect of the invention, a method for providing access via a multimedia-enabled network to a media resource is proposed. The media resource is controllably attachable to a network-registered device. The method comprises the steps of determining resource capability information indicating a capability of the media resource; transforming the resource capability information into service capability information indicating a capability related to a service accessible at the network-registered device via the network; and providing the service capability information to at least one of the network and an access-requesting entity.

The network may be an IMS network or any other network enabled for the provision of multimedia services. The term 'multimedia services' as used herein may comprise services related to the transport of data of any type of media. For example, a multimedia service may be related to transporting media data of a single type, e.g. audio data, video data, but also text data or application data. Further, the data may be aggregated data, comprising for example several data streams. Still further, the data may not necessarily be transported as streaming data, but may be subject to any other kind of transport mechanism.

The network-registered device may be any device adapted for registering in the network. For example, in IMS, any user device or user equipment (or terminal equipment) has to register in the network before making use of any of the services of the network. Not only user devices may have to register in the network, but in general any entity which may form an endpoint of a service offered by the network. As an example, an application server offering media data for download may also be an network-registered device. Any media resource adapted for registering in the network may thus be a network-registered device.

The attachable media resource may be any one of the resources discussed further above, for example a locally attached device or a remote service platform. Of course, the network-registered device itself may represent also a media resource (or several resources), which may be addressable via its associated Uniform Resource Identifier (URI). In contrast, the attachable media resource is to be understood within the context of the invention as a resource enabled to provide media data to the device it is attached to, when controlled accordingly. The media resource is external to the network-registered device and may be attached mechanically, e.g. via a plug, connector or a clip, or may be attached communicatively, for example by establishing a wireless communication. The media resource may also be a software application using hardware of the device or an external hardware. The communication between resource and network-registered device may then be performed via a software communication interface. The media resource may be un-attached after usage.

Providing the service capability information to the network may, for example, comprise provision of the service capability information to an attached services registration server in the network. The access-requesting entity may be any entity which is enabled to communicate with the network-registered device. For example, the access-requesting entity may be a user device or user equipment, or may be a server for providing media data, e.g. a video server. The network-registered device, the attached resource and/or the access-requesting device may be constituted by an application server.

To control the media resource, for example to generate or to store media data, corresponding resource control information is required by the controlling device. The resource capability information indicating a capability of the media resource, for example indicating its capability to provide or receive audio data or video data, may already be part of the resource control information or may have to be determined from the resource control information or otherwise.

The service capability information may relate to a service offered by the network and for which the device has been registered in the network. For example, the device may have announced its capability to handle an audio service of the network in the registration procedure.

The step of transforming the resource capability information into the service capability information may comprise the conversion or transcription of the resource capability information from a particular format into another format used for the service capability information, optionally including the addition or removal of information. It may also comprise the mapping of a part or all of the resource capability information to a part or all of the service capability information.

The step of providing the service capability information to an access-requesting entity may comprise registering the service capability information in the network, which then forwards the information to the entity for requesting an access later on. It may, additionally or alternatively, comprise directly announcing the information to the access-requesting entity. For example, the device may present one of the capabilities due to the attached resource to the network during registration, and may present another one of the capabilities due to the attached resource directly to the requesting entity.

The method according to the aspect discussed here may comprise the further steps of receiving a service request referencing the service capability information via the network; determining the attached media resource based on the referenced service capability information; and accessing the media resource based on the determination.

In an IMS network, a service request may be represented by a SIP INVITE message. Such a message may include the service capability information. Instead of directly providing the service capability information (and possibly further information provided during registration) it is also possible that the device during registration provided an identifier identifying an attached service, i.e. a service provided by the attachable resource. In this case it would be sufficient if the service request includes the identifier. From the information included in the service request, the user equipment has to determine which media resource to address. In case the received information is not sufficient, the UE may choose among the available attached media resources according to predetermined rules.

As an example, the received information may comprise a service capability information indicating the capability 'video' in some notation. The network-registered device may not have an internal video capability, but may have a camera attached to it. Thus the attached media resource may be determined from the received service capability information. The device then controls the identified attached media resource according to the resource control information available to the device.

The method may further comprise the steps of receiving media data generated by the media resource; and forwarding the media data to the network. The network-registered device may thus act as a gateway regarding the media data. The forwarding of the media data may also include to convert the media data, for example decode the data, which have been encoded by the media resource using a proprietary coding, and encode the data with a code used in the network. Alternatively or additionally, the step of forwarding the media data may include a transformation of the media data, for example to provide a particular Quality of Service (QoS). As an example, a user of an access-requesting entity which is subscribed for a "gold service", may receive an enhanced QoS compared to a user subscribed to a "basic service". In case the media data are sent from the access-requesting device to the media resource, the network-registered device may also act as a gateway, which may include decoding and encoding the data into a proper format for, e.g. storage on the media resource.

The media data may however be transmitted between the media resource and the access-requesting entity over a transmission path which does not include the network-registered device, for example a direct wireline transmission path may be established between the resource and the entity, whereas the network-registered device and the access-requesting entity communicate over a mobile IMS-network.

In case the transmission path includes the network-registered device, the device may initiate a service in the network, namely the service which is indicated by the service capability information. For example, a user agent in a user equipment may establish a SIP session for transmitting the media data via the network to the access-requesting device.

The step of transforming the resource capability information into the service capability information may comprise the steps of providing a mapping table in which the resource capability information is mapped to the service capability information; and determining the service capability information based on the mapping table.

The mapping table may for example be provided by the manufacturer of the media resource, or may additionally or alternatively be provided by the network operator. The table may be implemented in the network-registered device when a control routine for controlling the attachable media resource is installed. Additionally or alternatively, the mapping table may be automatically downloaded/upgraded when the media resource is attached, or when the device registers in the network. Looking up in the mapping table the resource capability information may directly lead to the service capability information stored associated therewith.

The step of transforming the resource capability information into the service capability information may also comprise the steps of presenting a user of the network-registered device an input form for entering input information related to associating the resource capability information to the service capability information. For example, an options menu might be presented to the user on a display of the device. The user may then choose the correct media type. In a further step, the input information may be received by the device, which provides the input information as the service capability information.

The service capability information may be obtained from a user input if no mapping table for mapping feature capability information to service capability information is available, for example because no table exists at all for the particular media resource, or because an existing table does not cover the mapping of the resource capabilities to the services provided by the network.

In the step of determining the resource capability information, the resource capability information may conform to a resource description format related to the media resource; and in the step of transforming the resource capability information into the service capability information, the service capability information may conform to a service description format of the network.

The resource capability information will in general specify features of the media resource and/or of the media data generated, stored or otherwise processed in the resource. These features may be related to, for example, the type of data, the generation of the data, e.g., a codec to be used for encoding and transmitting the data, a bandwidth for streaming media data, but possibly also buffer sizes, and further features related to the data transmission, the data presentation (e.g., screen resolution, character encoding support, audio volume), etc. For control purposes these features generally will be specified according to a resource description format. The resource description format will not generally conform to the service description format for the services of the network. For example, an IMS network based on SIP uses the format for indicating user agent capabilities which is specified in the IETF RFC 3840 (IETF Internet Engineering Task Force, RFC Request for Comment). However, a manufacturer of a media resource may rather use his own specific (proprietary) format.

It is also possible to map the resource capability information of the media resource in a first step to a general feature description format, for example the capability indication format according to the RFC 3840. In a second step, this representation of the resource capability information in a general format may then be mapped to a service description format of the network. This procedure is appropriate when the service description format is specific to the network.

The step of determining the service capability information may comprise the step of storing the resource capability information and the service capability information associated with each other in the network-registered device. This local mapping table may then contain the momentarily valid specific associations of attached media resource(s) and service(s) of the network for which the device is registered. In general, the mapping table may include several associations each comprising one and the same resource capability information and may also include several associations each comprising one and the same service capability information. For example, one and the same service capability information may be contained in several associations each containing a different resource capability information. Vice versa, one and the same resource capability information may be contained in several associations each containing a different service capability information.

The mapping table may comprise further entries related to, for example, the control of the attached media resources or identifiers identifying for the device each data record, in which a resource capability information is associated with a service capability information.

The network-registered device may comprise at least one user agent for handling, e.g. terminating, the service accessible at the network-registered device. The at least one user agent may send the service capability information to the network during a registration procedure of the user agent in the network.

Whereas the term 'user agent' is known to the skilled person from the SIP framework, denoting an endpoint for, e.g., SIP sessions, this term as used herein is to be understood to generally designate a control point for handling a service of the network for the network-registered device. Thus, also H.23 terminals may fall within is the scope of the term. The user agent may be implemented in the device, for example a user equipment, but may also be located in a node of the network which would still allow the agent to act on behalf of the user equipment.

The user agent registration procedure may generally include registration of service capabilities of the network-registered device in the network. The registration procedure may then include the step of providing the service capability information to the network, wherein the service capability information indicates the capability due to the media resource attached to the device. The registration procedure may comprise preparing and sending a register message to the network for the purpose of a first registration or a refreshing of an earlier registration.

The or any of the at least one user agents may, in response to receiving the service request, initiate establishment of the service accessible at the network-registered device. For example, in an IMS network, the user agent may initiate establishment of a SIP session to agree with the access-requesting entity on the service. The service, e.g. an audio or a video service, may then be established between both parties in the network.

The step of sending the service capability information to the network may comprise the step of sending service identification information to the network, the service identification information uniquely identifying the resource capability information which is associated to the service capability information in the network-registered device.

In case of an incoming service request for accessing the media resource, the user equipment has to determine the correct resource capability information in case of, for example, multiple attached resources or multiple capabilities of a single resource, e.g. the resource may be adapted to provide several media types (type of media data, e.g., audio and video) or the resource may addressed in different ways (for example, the resource may be attached via different communication interfaces). In case the device provides a local mapping table, the service identification information may be included in the table. For example, each data record defining an association of a service capability information to a resource capability information may be assigned a unique service identification information. Other assignment schemes are possible, as for a unique identification of a particular of the data records of the local mapping table it is sufficient that a combination of service identification information and service capability information is unique. For example, a service identifier may be re-used in the local mapping table, but may be used only once for a particular service capability information.

As an example, two (external) media resources may be attached, both being adapted for provision of audio data. To enable internal routing or dispatching of an incoming service request for audio, the data records may contain a different service identification information for each of both the relevant data records. The incoming request has to refer to one of the two service identification informations. The same holds for the case that one of the two services is an internal service whereas the other service is an attached service, or for the case that a single media resource may be addressed in different ways by the network-registered device. The service identification information may thus be used to uniquely identify local variations of a service.

In the step of sending the service capability information to the network, the service capability information may be included in a header of a network message sent to the network. For example, in an IMS network, the service capability information may be included in a SIP REGISTER message. It is also possible that the service capability information is included in a body of the network message.

The step of receiving media data generated by the media resource may comprise aggregating the media data of the media resource with media data of further sources. The network-registered device may then work as an aggregator. Also in the case that the media data are forwarded to the media resource, several data streams may be aggregated for storage or other processing at the media resource. Besides adding or multiplexing media data streams of further sources (external or internal to the network-registered device), aggregating media data may also comprise addition, removal, or further types of transformation of data to/from the media data. As an example, control data may be added to media data comprising, e.g., audio and/or video data. As another example, the media data received from the media resource may comprise video data of a high resolution. A user of the access-requesting device which is subscribed for a "gold service", may receive the high resolution media data, whereas a user of the access-requesting device which is subscribed to a "basic service", may only receive the media data with a low resolution. The step of receiving the media data may then comprise removal of the media data or transformation of the media data to the lower resolution.

The step of receiving the service request may comprise the steps of deciding on the service request based on decision rules; and providing the service based on the decision. The decision rules may be related to accepting or rejecting a request. Additionally or alternatively, the decision rules may be related to providing a particular (way of) service request processing to the access-requesting entity. The step of providing the particular (way of) service request processing to the access-requesting entity may for example include providing a particular QoS to the access-requesting entity or performing particular charging procedures. The decision rules may for example be configured by the subscriber or user of the network-registered device or may be provided by the operator of the network.

According to a second aspect of the invention, a method for providing access via a multimedia-enabled network to a media resource is proposed, wherein the media resource is controllably attachable to a network-registered device and the method comprises the steps of receiving from the network-registered device a service capability information indicating a capability of a service accessible at the network-registered device via the network, wherein the capability is related to the media resource; storing service registration information, wherein the service registration information comprises the service capability information associated with information for identifying the network-registered device; and providing the service registration information to an access-requesting entity.

The method may be performed in a service registration server of the network. For example, in an IMS network, the method may be performed in a S-CSCF (Serving Call State Control Function) or in a Presence Server. The service registration information may be stored in a service registration table of the server, for example in a SIP registry or a discovery table which is queried to respond to discovery requests (e.g. SIP OPTIONS messages) directed to the node. The information for identifying the network-registered device may comprise an address which is associated with the network-registered device, for example a network interface of a user device or an application server. In other cases, the address may comprise an URI related to a user of the network-registered device.

The step of receiving the service capability information may comprise the steps of receiving a service identification information from the network-registered device, the service identification information uniquely identifying a resource capability information which is associated with the service capability information in the network-registered device; and storing the service identification information associated with the service capability information in the service registration information. The service identification information will also be provided to an access-requesting entity, which in turn may include this information in a service request directed towards the network-registered entity.

The method may comprise the further step of routing a service request towards the network-registered device based on the service registration information. For example, in case the service request is directed to a user rather than a particular user equipment, the service capability information may be used to address the appropriate registered user equipment of the user.

According to a third aspect of the invention, a method for providing access of an access-requesting entity via a multimedia-enabled network to a media resource is proposed, wherein the media resource is controllably attachable to a network-registered device. The method comprises the steps of determining a service capability information indicating a capability of a service accessible at the network-registered device via the network, wherein the capability is related to the media resource; and sending a service request via the network to the network-registered device, the service request referencing the service capability information. The service request may be send directly to the network-registered device, or it may be sent to a redirect server or a proxy server.

The step of determining the service capability information may comprise discovering a service registration information provided by the network, wherein the service registration information comprises the service capability information associated with information for identifying the network-registered device. For example, in an IMS network, the discovery procedure comprises sending a SIP OPTIONS message to a location server with a discovery table in the network. The server will answer by sending the service registration information related to the network-registered device to which the media resource is attached.

The step of determining the service capability information may comprise determining a service identification information identifying a resource capability information which is associated with the service capability information in the network-registered device. The service identification information may be included into the service request directed towards the network-registered device to allow an identification of, e.g., the media resource and the media type to which access is requested.

In the step of sending the service request, at least one of the service capability information and the service identification information may be included in a header of a network message representing the service request. For example, in an IMS network, the service request may be represented by a SIP INVITE message. The header of this message may include an indication of the requested service, e.g., in the accept-contact and/or in the reject-contact header fields of the INVITE message. The network-registered device will then be adapted to extract the media service information from these fields. The information may also be included in a body of the network message.

According to another aspect of the invention, a computer program is proposed, the program comprising program code portions for performing the steps of any one of the method aspects of the invention described herein, when the computer program is run on one or more computing devices. The computer program may be stored on a computer readable recording medium, for example a CD-ROM or DVD.

According to a still further aspect of the invention, a network-registered device for providing access via a multimedia-enabled network to a media resource controllably attachable to the network-registered device is proposed. The network-registered device comprises a determination component for determining resource capability information indicating a capability of the media resource; a transformation component for transforming the resource capability information into service capability information indicating a capability related to a service accessible at the network-registered device via the network; and an interface component for providing the service capability information to an access-requesting entity.

The network-registered device may for example be a user device or user equipment (terminal equipment), or it may be a server for providing media data, for example an application server.

The network-registered device may further comprise a user agent for terminating the service accessible at the network-registered device, wherein the user agent is adapted to send the service capability information to the network during a registration procedure of the user agent in the network. The user agent may for example read the service capability information from a local mapping table in the network-registered device and include the information in a registration message. The user agent may read further optional information from the local mapping table, for example service identification information.

The network-registered device may further comprise a control component for accessing the media resource. The component may be implemented as a software application. The component may be adapted for forwarding a service request received from the access-requesting component to the attached resource, i.e. the component may act as a gateway. The gateway may include the functionality to transform the service request according to a resource description format for accessing the media resource. In case the service requested does not directly coincide with a service as provided by the media resource, the component may map the requested service to a suitable attached service of the attached resource.

The network-registered device may further comprise a gateway component for receiving media data generated by the media resource and forwarding the media data to the network. The gateway component may for example be adapted to decode the data generated by the media resource and encode them using a codec appropriate for the network.

According to a still further aspect of the invention, an attached service registration server of a multimedia-enabled network is proposed which is adapted for providing access to a media resource controllably attachable to a network-registered device. The attached service registration server may comprise a first interface component for receiving from the network-registered device a service capability information indicating a capability of a service accessible at the network-registered device via the network, wherein the capability is related to the media resource; a storage component for storing service registration information, wherein the service registration information comprises the service capability information associated with information for identifying the network-registered device; and a second interface component for providing the service registration information to an access-requesting entity.

In an IMS network, the attached service registration server may be implemented as part of a server system comprising one or more of a registrar, location server, proxy server and redirect server. The attached service registration server may be collocated with an S-CSCF or a presence server. The attached service registration server may further comprise a routing component for routing a service request toward the network-registered device based on the service registration information. The routing component may for example be adapted to analyse the service capability information stored in a discovery table to determine a correct user equipment of a user to which to route a service request.

According to a still further aspect of the invention, an access-requesting entity is proposed which is adapted for accessing via a multimedia-enabled network a media resource controllably attachable to a network-registered device, wherein the first user equipment comprises a determination component for determining a service capability information indicating a capability of a service accessible at the network-registered device via the network, and wherein the capability is related to the media resource; and an interface component for sending a service request via the network to the network-registered device, the service request referencing the service capability information. The access-requesting entity may for example be a user device or user equipment (terminal equipment), but may also be a server for providing media data, for example an application server. The access may then for instance allow the server to store data on the attached resource, which may be a storage medium.

BRIEF DESCRIPTION OF THE DRAWINGS

In the following, the invention will further be described with reference to exemplary embodiments illustrated in the figures, in which:

FIG. 10*c* schematically illustrates a further embodiment of a local ASI mapping table;

FIG. 10*d* illustrates an embodiment of a service registration table stored in an attached service registration server;

FIG. 11*a* shows an example embodiment of a register message used for announcing the capabilities of an attached media resource;

FIG. 11*b* illustrates another embodiment of a register message;

FIG. 11*c* illustrates an example embodiment of an INVITE message.

DETAILED DESCRIPTION OF PREFERRED EMBODIMENTS

In the following description, for purposes of explanation and not limitation, specific details are set forth, such as specific network topologies including particular network nodes, communication protocols etc., in order to provide a thorough understanding of the current invention. It will be apparent to one skilled in the art that the current invention may be practiced in other embodiments that depart from these specific details. For example, the skilled artisan will appreciate that the current invention may be practiced with multimedia-enabled networks different from the 3GPP IMS network discussed below to illustrate the present invention. Also, the invention may be practiced with any network which offers services related to transporting media data to its users. The invention is not only applicable to mobile networks, but also to networks connecting immobile equipment. As an example, the invention may also be applied to process control systems comprising multiple interconnected terminals and operator workstations for operating, administrating and inspecting field devices.

Any multimedia network provides for communication via network specific service control protocols for invoking, maintaining and tearing down a service. An IMS network, for example, requires the SIP protocol suite, which is also used in the following to illustrate the invention. However, the invention is also applicable to any other service control protocol framework which may, e.g., based on the H.323 protocol suite or protocols to be developed in the future.

Those skilled in the art will further appreciate that functions explained hereinbelow may be implemented using individual hardware circuitry, using software functioning in conjunction with a programmed microprocessor or a general purpose computer, using an application specific integrated circuit (ASIC) and/or using one or more digital signal processors (DSPs). It will also be appreciated that when the current invention is described as a method, it may also be embodied in a computer processor and a memory coupled to a processor, wherein the memory is encoded with one or more programs that perform the methods disclosed herein when executed by the processor.

The term 'interface' as used herein may denote a 'functional interface', i.e. a sub-structure contained within a functional component or higher-level structure (e.g., a hardware and/or software component or functional entity) specifically designed for performing communications with further, external components or structures. A functional interface may typically, but not exclusively, be implemented in software.

Figure 1:
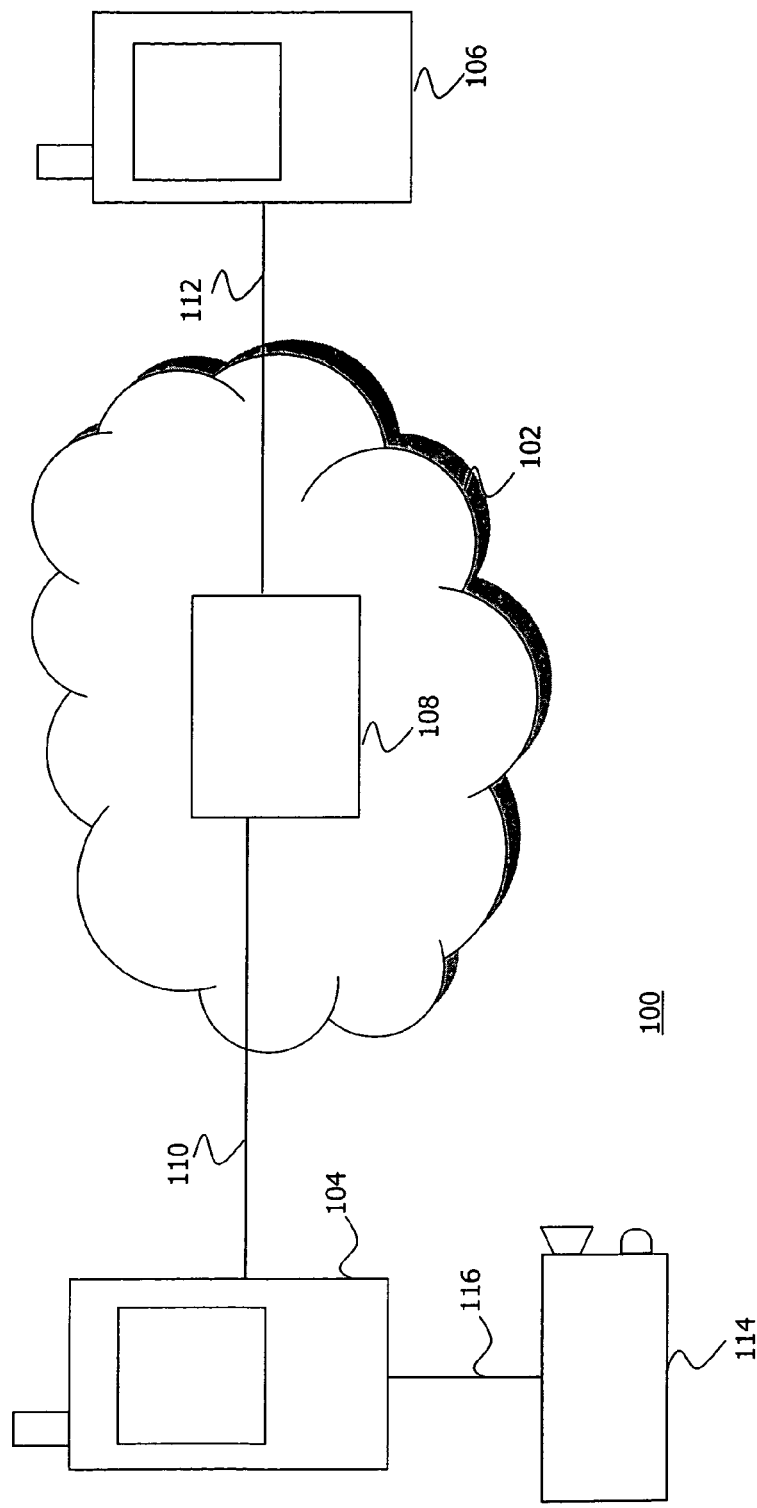
FIG. 1 is a schematic illustration of an embodiment of a multimedia-enabled network.

FIG. 1 schematically illustrates an embodiment of a network structure 100. The structure comprises a multimedia-enabled network 102, a network-registered device 104 and an access-requesting entity 106. The network 102 is an IMS domain of a UMTS (Universal Mobile Telecommunications System) network. The network 102 comprises a service registration server 108 implementing the functionalities of a SIP registrar and a proxy or redirect server. The network-registered device and the access-requesting entity are both illustrated as being items of user equipment (UE), whereas in other embodiments, one or both of the items 104, 106 may for example be an application server or similar media generating, storing or processing device. Both UEs 104, 106 may be mobile phones equipped with a software player for playing AV (Audio-Video)-sequences.

The user equipment 104 is shown associated with the network 102 (the server 108) by an association 110. The association 110 may be any SIP based association; for example, the association 110 may illustrate a SIP session. The UE 106 has a similar association 112 to the network 102 (the server 108). The associations 110, 112 are intended to indicate SIP-based relations between the UEs and the control server 108. For example, the UE 104 may comprise a user agent (not shown in FIG. 1) which has to register in the network 102, i.e. at the server 108, as a prerequisite before terminating any service from the network. The association 110 may thus indicate the message exchange for the SIP registration procedure between the UE or network-registered device 104 and registrar 108.

A media resource such as an external camera 114 is attached via a link 116 to the UE 104. The resource 114 comprises a video-camera and a microphone. The camera 114 is adapted to generate multimedia data, i.e. a combination of streaming video data and audio data. These data may be provided via the link 116 to the user device 104. The link 116 is a USB connection (or may also be a wireless connection, for example a Bluetooth connection). The UE 104 has implemented a software application (not shown) for controlling the camera 114.

The UE 104 may, for example, control the camera 114 for acquisition of an AV-sequence, and may receive the acquired multimedia data, for example in streaming mode, via the link 116. The UE 104 may then provide the media data to the UE 106 via the multimedia network 102. For this purpose, the UEs 104, 106 have to establish a multimedia streaming service of the network. The UEs may establish a SIP session via the associations 110, 112 to agree upon the appropriate service. The multimedia data itself may or may not be transmitted via server 108.

Alternatively, the UE 106 may access the camera 114 via the network 102 and the UE 104. The access-requesting entity 106 may control the camera 114 and may receive multimedia data generated in response to the control from the media resource 114. This will be discussed in more detail with reference to the following figures.

To enable access to the media resource 114, the UE 104 registers at the attached service registration server 108, which includes providing the server 108 with a service capability information announcing the capabilities of the media resource 114 to the network 102. The registrar 108 stores the service capability information. The UE 106 discovers the service capability information stored at the server 108 by performing a discovery procedure. The UE 106 determines from the discovered service capability information the parameters required for a multimedia service request (a SIP INVITE), which is transmitted via the SIP associations 112, 110 (possibly using intelligent routing at the server 108) to the UE 104.

The UE 104 accesses the camera 114 according to the request received from the UE 106. The UE 104 may further act as a gateway, converting media data provided by the camera 114 into multimedia data as required by the established multimedia service of the network 102 for transmission to the UE 106. The media data provided by the attached media resource are forwarded (possibly after conversion) by the UE to the network based on the multimedia service of the network, which has been established between the UEs. An 'attached service' as denoted herein may not only comprise the functionality of the attached media resource, but may also incorporate the interworking to provide for the access-requesting entity access to the media resource attached to the network-registered device via the network. Attached services are services based on media resources external to the network-registered device which are attachable to the device. As the media resource may be hardware and/or software, the attached service may be a hardware- and/or software-based service.

Figure 2:
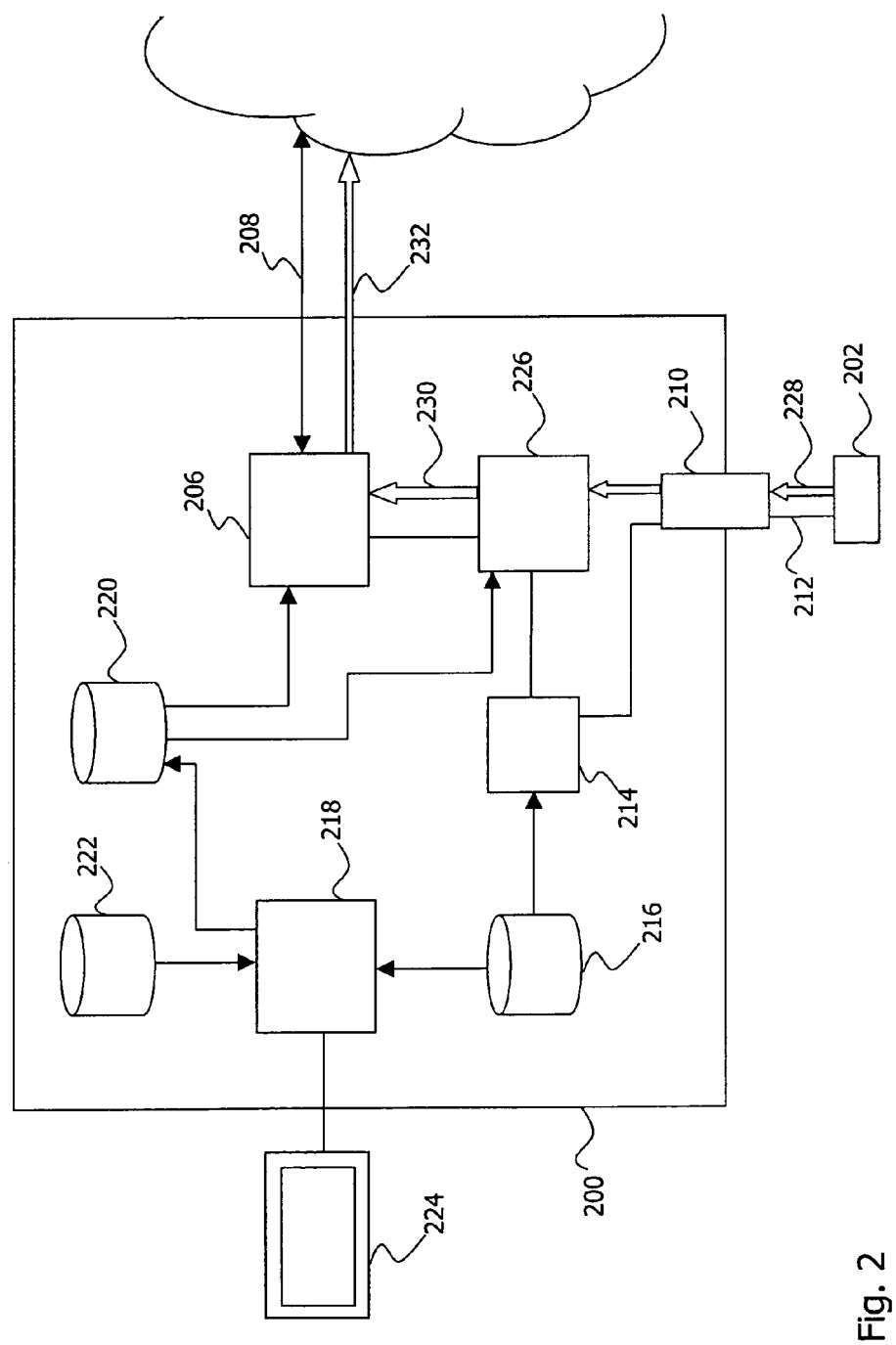
FIG. 2 is a functional block diagram schematically illustrating an embodiment of a network-registered device.

FIG. 2 is a functional block diagram schematically illustrating an embodiment of a network-registered device 200 adapted for enabling access to an attached media resource 202 from an IMS network 204. The network-registered device 200 is a user device which may be an embodiment of the UE 104 in FIG. 1. Network 204 may then correspond to network 102 in FIG. 1 and media resource 202 may correspond to resource 114 in FIG. 1.

The UE 200 comprises a user agent 206 for setting up SIP associations 208 to the IMS network 204. The user equipment 200 further comprises an interface 210 for communication with the media resource 202 via a link 212. A resource control application 214 is implemented in the user equipment 200. The application 214 controls the camera 202 and may also receive multimedia data from the camera 202 for storing and/or further processing in the UE 200. For controlling the camera 202, the application 214 retrieves resource capability information from a resource information storage 216. The resource capability information indicate capabilities of the media resource 202.

The resource capability information is stored in the storage 216 in a particular resource description format, which enables control of the media resource 202 by the control component 214 via the interface 210. The resource description format is a proprietary format, i.e. specific for the manufacturer of the resource 202. Therefore, the control application 214 is specifically adapted, e.g. for addressing and controlling the media resource. The application 214 may have been provided by the manufacturer to the buyer of the camera 202 to enable control of the camera by the UE 200.

The user equipment 200 further comprises a determination and transformation component 218, which is adapted to read resource capability information from storage 216. The resource capability information is transformed by the component 218 into service capability information indicating a capability related to one or more of the services accessible at the network-registered device 200 via the network 204. The determination and transformation component 218 stores the service capability information in a service information storage component 220.

For the transformation procedure, the transformation component 218 may access a mapping table stored in a mapping storage component 222. In the mapping table, the resource capability information is mapped to the service capability information. For example, the table may contain features related to the types of media data generated in the camera 202, wherein the features are associated to a particular of the services provided by network 204, for which the network-registered device 200 may register.

The mapping table may for example be automatically generated by the network-registered device. For example, the device may detect that a media resource is attached to the device. This detection may then trigger the generation of an appropriate mapping table. Additionally or alternatively, the mapping table may be provided by an operator of the network 204. The table may then comprise mapping data related to a large number of media resources, which may be attached to user equipments for use with the network 204. In an alternative embodiment, the transformation component 218 may access a mapping table stored at a website hosted by the operator of the network 204. This would allow updating the mapping table promptly with data related to new media resources or new services provided by the network.

In still another embodiment, a mapping table may be provided at a website hosted by the manufacturer of a media resource. The mapping table may map resource capabilities of the media resources of the manufacturer to the multimedia services of several multimedia-enabled networks, for example, IMS networks.

In the case that no mapping table is available or the available mapping table does not contain an entry for the particular capability of the attached resource, the transformation component may present on a display 224 of the user device 200 an input form, requesting a user to enter input information. The input form may present the resource capability information in a format readable by humans. The user may then choose from several options a appropriate service of the network 204 for transporting media data generated by the media resource 202. The chosen service may then be used by the transformation component 218 to generate the service capability information.

A combination of the alternative embodiments exemplified hereinbefore is also possible. The determination component may scan first a mapping table stored locally in the user equipment; in case of an unsuccessful search, the component may then access a mapping table at a website of the network provider or the manufacturer, and may only in case of an unsuccessful attempt present some mapping options to the user via a configuration display.

For using services of the network 204, the user agent 206 has incorporated an interface component (not explicitly shown) for providing the service capability information to the network 204 during a registration of the user agent in the network. The registration procedure is initiated by sending a SIP REGISTER message to the network (illustrated by SIP association 208). Preparing the registration procedure, the user agent 206 reads the service capability information stored in the storage component 220 for the attached media resource 202. The service capability information may also contain information related to multimedia capabilities internal to the user equipment 200. The interface component incorporated in the user agent 206 constructs a REGISTER message which includes the service capability information and sends the message to the network.

After registration, the user agent 206 may receive a service request from the network (e.g., a SIP INVITE message). In response to the request, the user agent 206 may establish a SIP session (also illustrated by the association 208). Access from the network 204 to the media resource 202 then comprises sending control information within the established SIP session to the user agent 206. Alternatively or additionally, a part or all of the control information may already be included in the header of the SIP message, such that no SIP session needs to be established.

Due to the received service request, the user agent 206 instantiates a gateway component 226 and passes control information to the gateway 226. The gateway 226 is adapted to transform control information received from the user agent (given in a service description format for the services of the network) into control information in a resource description format, and to forward the transformed control information to the control component 214 for controlling the interface 210 and the media resource 202. For the transformation of control information, the gateway 226 may read the local mapping table in the storage 220. The user agent may provide to the gateway 226 a pointer to the storage location of the local mapping table.

The media data 228 generated by the resource 202 in response to the control are transmitted via the interface 210 to the gateway 226. The gateway 226 may convert the media data and forward the converted data 230 to the user agent 206, which sends the media data to the network 204 using the service agreed upon in the SIP session. The transmission of media data 232 may not follow the same path as the SIP session 208, but may be sent directly to the requesting user agent (not shown in FIG. 2).

Figure 3:
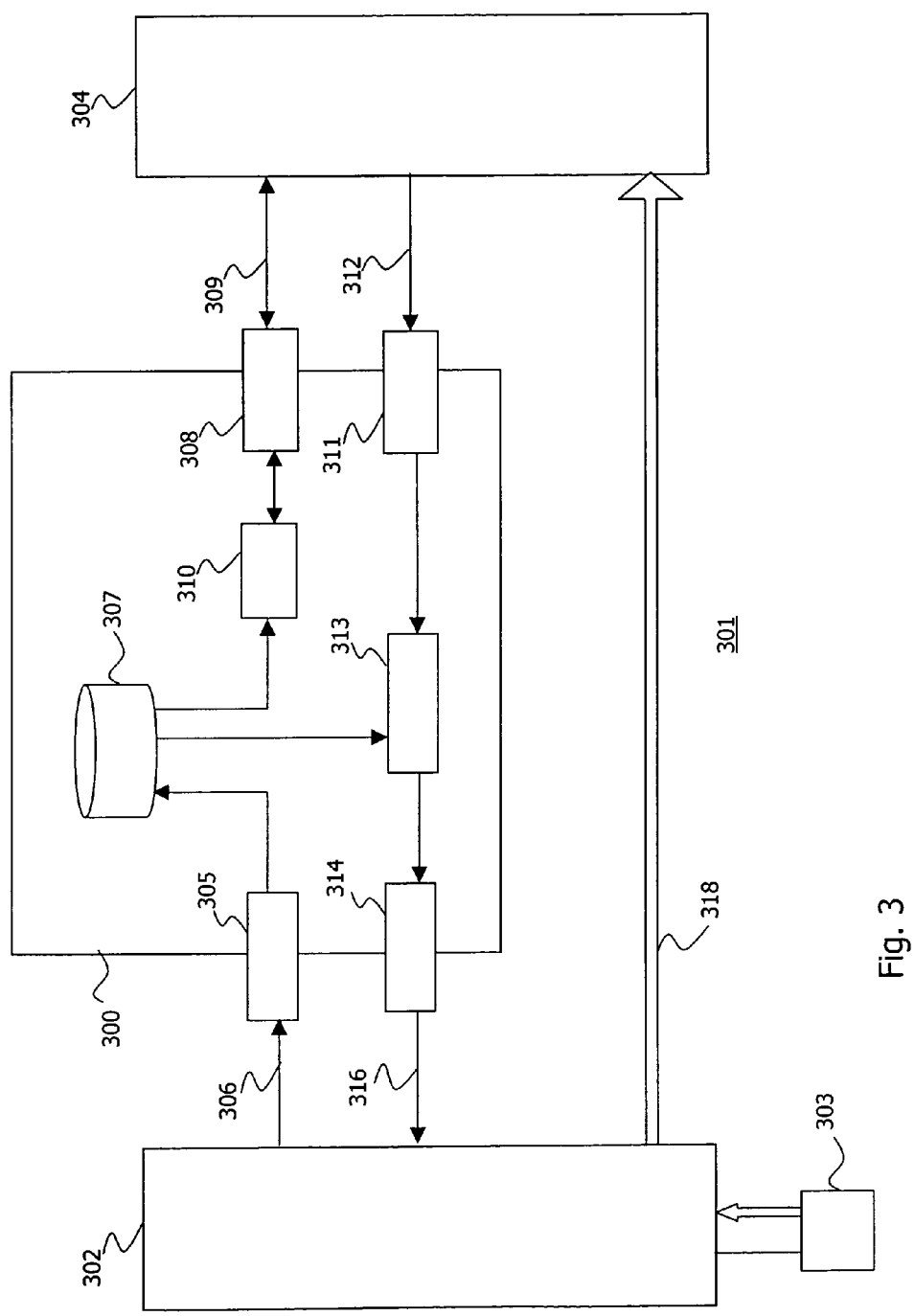
FIG. 3 is a functional block diagram schematically illustrating an embodiment of an attached service registration server of a multimedia-enabled network.

FIG. 3 is a functional block diagram schematically illustrating an embodiment of an attached service registration server 300 of a multimedia-enabled network 301. The server 300 may be an embodiment of the server 108 of network 102 in FIG. 1. The server 300 may comprise components implementing functionalities of a SIP registrar server, and further of a SIP proxy server or redirect server, which are not shown in FIG. 3. A network-registered device 302 may be an embodiment of the user equipment 108 of FIG. 1 or of the user equipment 200 of FIG. 2. A media resource 303 may be an embodiment of the media resource 114 of FIG. 1 or the media resource 202 of FIG. 2. An access-requesting entity 304 may be an embodiment of the user equipment 108 of FIG. 1 or of the user equipment 200 of FIG. 2.

The server 300 comprises an interface component 305 for receiving a registration request 306 from the user equipment 302. The request 306 may be represented by a SIP REGISTER message. The interface 305 is adapted to extract from the request 306 a service capability information and store the service capability information in a service registration table or SIP registry storage component 307.

The server 300 further comprises an interface component 308, which is adapted to receive a request 309 for discovering an attached service related to a specific UE (the UE 302) or related to a specific subscriber (user), for example the user of the UE 302. The request 309 may be represented by a SIP OPTIONS message. The interface component 308 is adapted to forward the request to a location service component 310 of server 300. Based on the request, the component 310 queries the table stored in the SIP registry storage component 307 for attached services, for which the user equipment 302 is registered. Stored in the service registration table is a service registration information comprising the attached service capability information associated with information for identifying the network-registered device 302. The stored services include attached services, i.e. services related to the attached media resource 303 of UE 302. As a result of the query, one or more data records are returned to the location service component 310 indicating at least the service capability information related to the resource capability of the resource attached to UE 302. The location service component 310 returns the data to the interface component 308, which sends the discovery result to the user equipment 304.

The server 300 further comprises an interface component 311 for receiving from the UE 304 a service request message 312 for requesting access to the attached resource 303. The service request may be a SIP INVITE message. The interface component 311 forwards the service request to a routing component 313. The routing component 313 determines, if routing information is required for routing the request towards the UE 302. A destination address information in the service request may generally be related to a user (subscriber), or to a user equipment. As an example for the former case, a destination address information in the service request 309 may be related to the user of the user equipment 302. Then, the routing component 313 may extract an attached service information from the service request and may query the service registration table in storage 304 to retrieve an URI of the correct user equipment which provides access to the requested attached service.

In the case that a destination address information in the service request is related to a user equipment, i.e. the network-registered device is endpoint-addressed (e.g. PSI-routing), no further routing information may be required. Having determined the user equipment address to which to route the service request (e.g., the address of the user agent collocated to the user equipment 302 offering the attached service), the routing component 313 forwards the service request (the SIP Invite) to an interface component 314, which is adapted to forward the request 316 further to the user equipment 302.

The media data 318 generated by the media resource 303 in response to the access of the UE 304 to the media resource may be transmitted directly from the user equipment 302 to the user equipment 304, i.e. the service registration server 300 may not be required for routing the media data 318.

Figure 4:
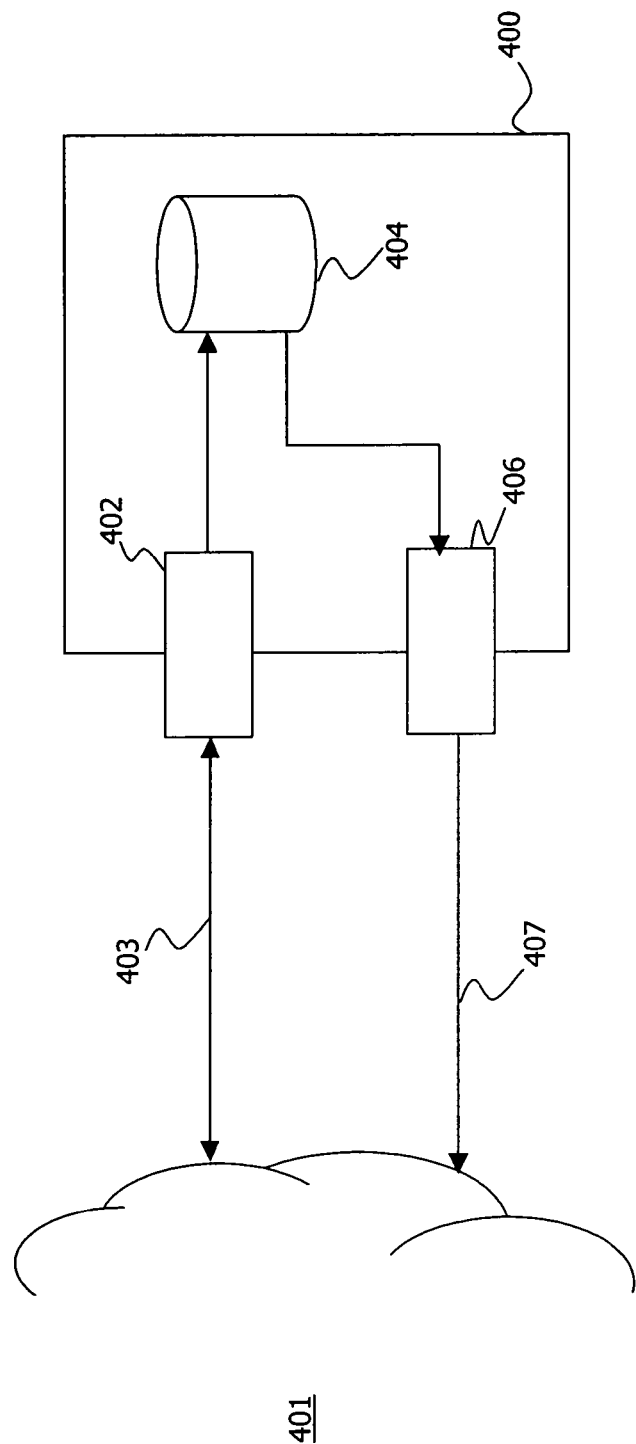
FIG. 4 is a functional block diagram schematically illustrating an embodiment of an access-requesting device.

FIG. 4 is a functional block diagram schematically illustrating an embodiment of an access-requesting device 400 adapted for discovering attached services in a network 401 and for requesting these services. The UE 400 may be an embodiment of the UE 104 of FIG. 1 or UE 304 of FIG. 3.

The user equipment 400 comprises a first interface component 402, which is adapted to construct a discovery message for discovering service capability information from the multimedia-enabled network 401. In a communication 403, the discovery message may be send to the network 401, either to an attached service registration server of the network, or to a network-registered device. The discovery message may be a SIP OPTIONS message. As a result of the discovery procedure, the interface component 402 may receive from the network in the communication 403 at least one data record comprising an attached service capability information related to a media resource attached to the network-registered device.

The user equipment 400 stores the received service capability information records in a storage component 404. The user equipment 400 further comprises a second interface component 406 adapted to read the service capability information from the storage component 404 and to construct a service request message 407 based on the service capability information. The message may for example be a SIP INVITE message. The service request 407 may then be forwarded to the network-registered device offering the attached service.

Figure 5:
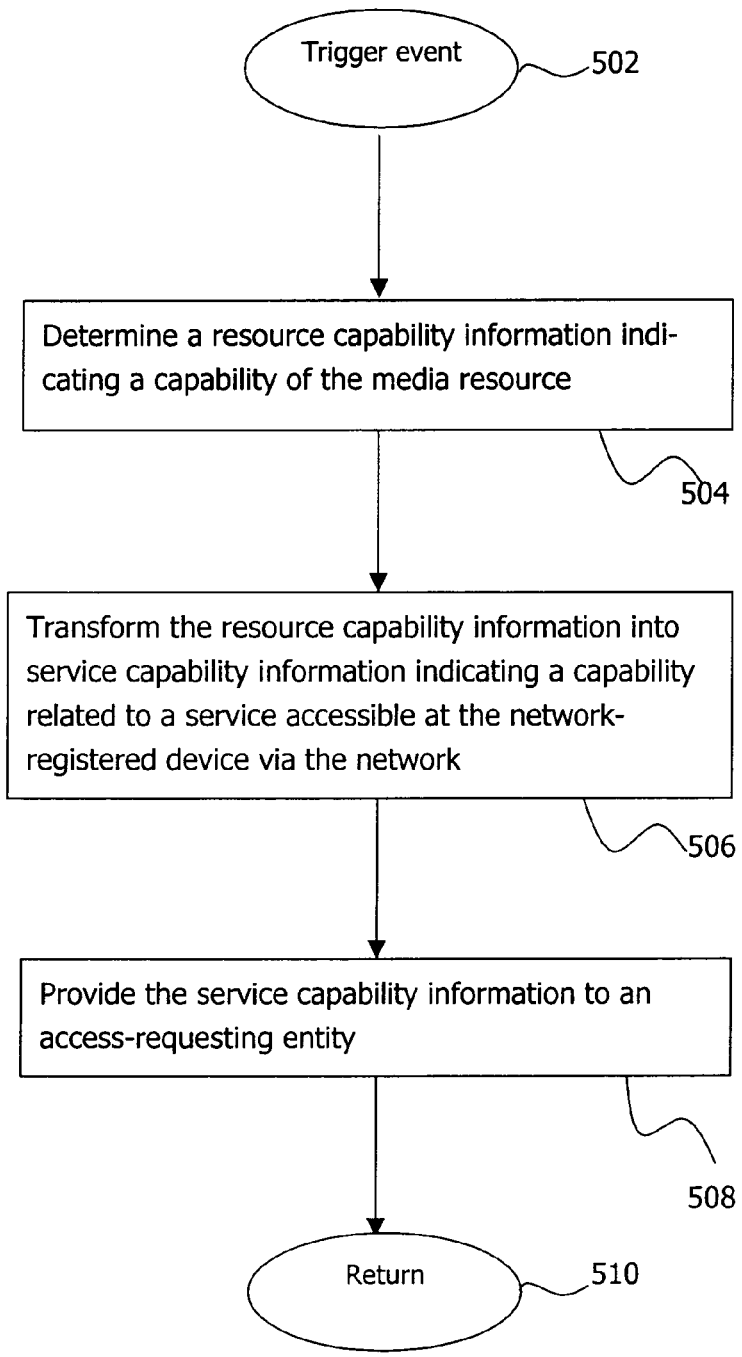
FIG. 5 is a flow chart illustrating an embodiment of a method for providing access from a multimedia-enabled network to a media resource.

FIG. 5 is a flow diagram illustrating an embodiment 500 of a method for providing access from a multimedia-enabled network to a media resource, wherein the media resource is controllably attachable to a network-registered device. The device may be the UE 104 of FIG. 1, the UE 200 of FIG. 2 or the UE 302 of FIG. 3.

The routine 500 is triggered by a trigger event 502. For example, the routine may be started by a registration procedure preparing registration of the network-registered device in the network. Routine 500 may also be triggered in case a new media resource becomes attached to the network-registered device.

In a step 504, a resource capability information is determined, the resource capability information indicating a capability of the media resource. The resource capability information will generally be required by the user equipment to be able to properly control the attached media resource and to process media data related to the media resource. The resource capability information may for example comprise an indication of a media type of the data provided (e.g., generated) by the attached resource. The media type indicates the type of media data, for example audio, video, etc. The resource capability information may comprise an address information indicating how to address the attached resource. The resource capability information will in general be represented in a resource description format, which may be specific for the manufacturer of the user equipment and/or the manufacturer of the media resource or which is specific to the communication technique utilized between the network-registered device and the attached media resource.

The resource capability information may comprise further information related to control of the media resource and/or features of the media data related to the media resource. Examples are the used codecs, available bandwidths for streaming media, required transmission capabilities, for example buffer sizes, transmission protocols, required terminal capabilities for presentation of the media data, etc.

In step 506, the resource capability information is transformed into a service capability information indicating a capability related to a service accessible at the network-registered device via the network. The service capability information may represent some or all of the capabilities of the media resource which are represented within the resource capability information in a form, which can be processed by network nodes and other items of user equipment adapted to the network. For example, there may be a specific service description format for services of the network. An example for such a format is specified by the IETF RFC 3840 and RFC 2506, wherein an ASCII- or ASN.1-based notation is proposed for a SIP framework.

The step 504 of determination of the resource capability information may comprise to simply provide the resource capability information for the subsequent step 506. In case there is no resource capability information available to the user equipment, the step of determining the resource capability information may for example comprise presenting an input form to a user to let him specify the media type of the data generated by the attached media resource. The data input by the user then is provided as a representation of a resource capability information, which will be transformed into the service description format to yield the service capability information.

In step 508, the service capability information is provided to an access-requesting entity. Announcing the media resource capabilities to the network, for example to a registry associated to a CSCF or a presence server, allows that a second user equipment may discover the media resource capabilities. The second UE may then address these capabilities by initiating a multimedia service via the network towards the first user equipment. For the case that media data are to be sent from the media resource to the second user equipment, the first user equipment may comprise functionalities of a gateway. The step 508 may comprise registering or refreshing a registration in the network.

Additionally or alternatively, the service capability information may be provided to a presence server or directly to the access-requesting entity. The method returns in step 510 to a higher control layer, for example a control procedure for performing a registration of the network-registered device in the network.

Figure 6:
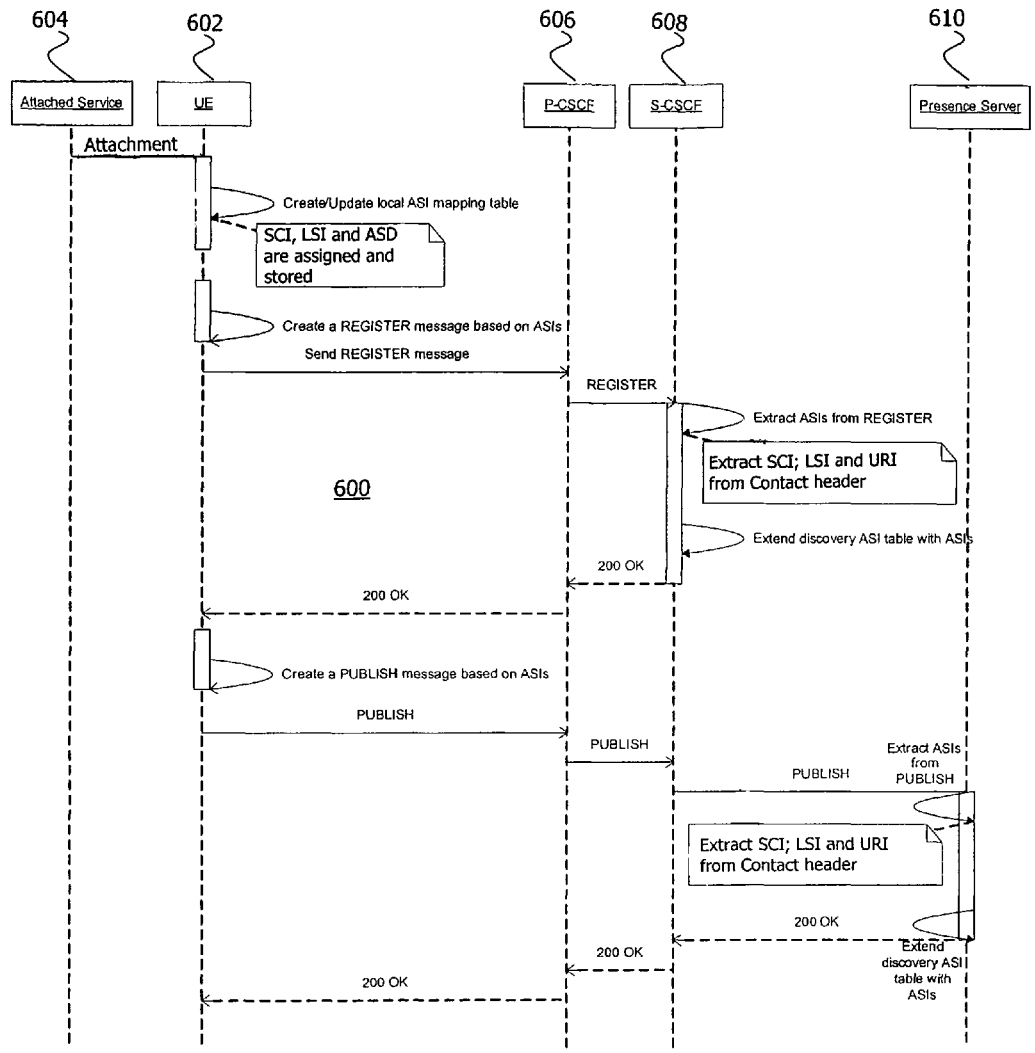
FIG. 6 is a sequence diagram of an embodiment of a method for registering a user equipment in a multimedia network.

FIG. 6 is a sequence diagram (a call flow) of an embodiment of a method for registering a user equipment 602 in a multimedia network. The user equipment 602, which may be an embodiment of the UE 104 in FIG. 1, UE 200 in FIG. 2 or UE 302 in FIG. 3 has a media resource 604 attached to it. The multimedia network comprises a Proxy-CSCF (Call State Control Function) 606 and a Serving-CSCF 608, which may comprise the functionality of a SIP registrar. The CSCF 608 may implement an embodiment of the service registration server 300 of FIG. 3. The network further comprises a presence server 610, which implements a presence service according to 3GPP TS 23.141 and TS 24.841. A presence service provides the ability for a network to manage presence information of a user's device even when the device is roaming in another network. A user's presence information may be obtained through input from the user, for example sending a Publish message to the presence server. As presence services are known to the skilled person, a detailed description is omitted herein.

The media resource 604 may be attached to the user device 602 by manually connecting it or by establishing a network connection. Information concerning the capability of the media resource may for example be requested by the user device via a local discovery mechanisms (e.g. a broadcast in the local network) or may be preinstalled in the device and activated by attaching the resource. After attachment, the user device 602 may create or update a local ASI (Attached Service Identifier) mapping table. In the embodiment of FIG. 6, an ASI contains an attached service capability information. Before describing the structure of the local ASI mapping table with reference to FIG. 10b, the structure of an embodiment of an attached service information is illustrated with respect to FIG. 10a.

Figure 10A:
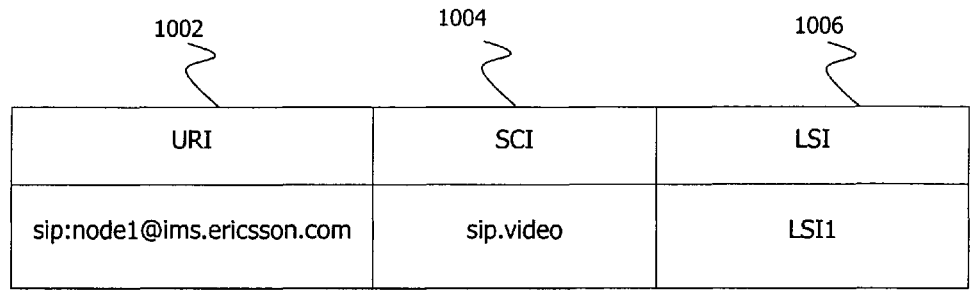
FIG. 10*a* schematically depicts an attached service identifier.

FIG. 10a schematically depicts an attached service identifier or ASI 1000 comprising a uniform resource identifier (URI) 1002, a service capability information (SCI) 1004 and a local service identifier (LSI) 1006. The ASI 1000 may be stored in ASCII-format in the user equipment 602 (SIP is an ASCII-based protocol). The URI 1002 is a SIP-address, wherein "node1" may reference the user device 602, which may facilitate PSI(Public Service Identity)-routing of service requests to the network-registered device. Other embodiments of an ASI may include an URI referencing the user of the device, for example with an address of the type "sip: user1@ . . . ".

The service capability information 1004 conforms to the IETF standard given in RFC 3840, wherein a notation for media feature tags is specified (see section 10.5 of RFC 340 for video data). In other embodiments, an internal representation of an ASI including an SCI (or feature tag) may also be based on the ASN.1 notation, see RFC 2506, section 2.4.

The ASI 1000 of FIG. 10a further comprises as a third component the local service identifier 1006. The LSI 1006 is a particular embodiment of a service identification information (SII), which serves to uniquely identify a resource capability information which is associated to the service capability information in the network-registered device, as will be explained below. In further embodiments, the service capability information and/or the ASI may comprise also attributes specifying technical properties of the media service/media data, to which they are related.

Figure 10B:
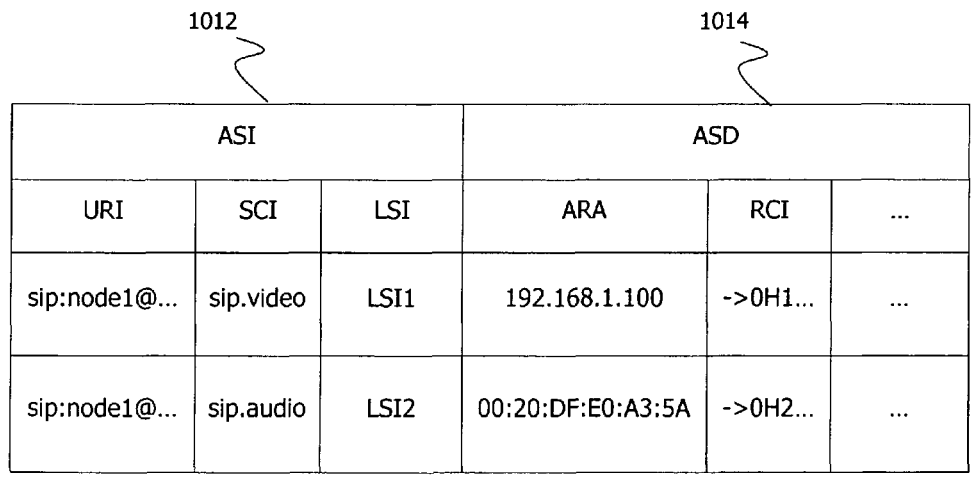
FIG. 10*b* schematically illustrates an embodiment of a local ASI mapping table.

FIG. 10b schematically illustrates an embodiment 1010 of a local ASI mapping table stored for example by user equipment 602 in FIG. 6. The mapping table 1010 basically comprises a first column 1012 containing the ASIs related to the resource/s attachable or actually attached to the network-registered device and a second column 1014 containing for each ASI an associated attached service description (ASD), which is a particular embodiment of a resource capability information. The ASI column 1012 is used to register the attached services in the network.

The ASIs in column 1012 follow the structure as outlined in FIG. 10a. In this example, a single media resource (e.g. the resource 604 of FIG. 6) is attached to the user equipment. The resource may provide two types of media data, video and audio. Each ASI contains a unique LSI, i.e. the media types are uniquely referenced by the local service identifiers LSI1 and LSI2, respectively. In other embodiments, the LSI or in general an SII may be used to differentiate between at least one of different types of media, multiple media resources, various communication links to a media resources, etc. Generally speaking, the SII allows to uniquely reference or differentiate between the instances of one or more attached services. The ASD column 1014 of mapping table 1010 specifies for each ASI control data for controlling the attached media resource according to its capabilities.

The first column of the ASD specifies an attached resource address (ARA), namely the address of the attached resource represented in a format corresponding to the communication technology utilized between the network-registered device and the attached media resource. In the example illustrated in FIG. 10b, the media resource may be accessed via the IP protocol stack for generation of video data, whereas the resource may be accessed via the Bluetooth protocol stack for generation of audio data. In other words, the attached resource may provide video data via an IP communication and may provide audio data via a Bluetooth communication. Thus the capabilities of the attached resource may be controlled by choosing the appropriate communication interface.

A further column of the ASD specifies resource control information (RCI) of the attached media resource, for example control commands. In the example illustration of FIG. 10b, instead of the RCI data itself, a pointer is given which points to an address in a storage of the user equipment, where the appropriate control information for controlling the media resource is stored. For the example of the UE 200 of FIG. 2, the pointers may be directed towards storage addresses of the resource information storage 216. Further data related to resource capability information may be specified in further columns of the ASD 1014.

The Attached Service Address column 1014 contains information that is specific to the various technologies used to access the attached services. As an example for the ARA, IP-based services may require IP-addresses, Web Services may require an URL, non-IP services may require other standardized or proprietary address information.

FIG. 10c schematically illustrates a further embodiment 1020 of a local ASI mapping table. The basic structure with two columns for ASI and associated resource capability information resp. ASD is similar to the embodiment of FIG. 10b. The first and second rows in the table correspond to the same type of media data (video) for a single attached resource comprising video capability. The attached resource may be addressed in different ways (via different network interfaces), i.e. accessed via different IP-addresses. Here, the local service identifiers 1022 (LSI1, LSI2) are required to uniquely identify a particular resource capability information data record.

Referring to FIG. 6 again, after having created a local ASI mapping table representing the service capability information in SIP-format, the UE 602 constructs a SIP REGISTER message including the ASIs contained in the local ASI mapping table. When preparing the REGISTER message, a user agent of the user equipment may read from the local ASI mapping table the SCIs related to the SIP framework, convert the SCIs into parameters and insert these parameters into the message. Service identification information, e.g. LSIs, may also be inserted.

FIG. 11a shows an example embodiment 1100 of a REGISTER message conforming to the standard IETF RFC 3840, which may be used for announcing the capabilities of the attached media resource represented in the mapping table 1010 of FIG. 10b. Line 1102 of message 1100 specifies the capabilities of the user agent sending the REGISTER message (here acting on behalf of a user, not a particular user equipment). The service capabilities 'audio' and 'video' may have been retrieved from the ASI column of a local mapping table and are announced as capabilities of the attached resource to the network.

Although the ASI in table 1010 contains local service identifiers, these may not necessarily be included in an announcement to the network as long as it is possible for the network-registered device to uniquely determine on reception of a service request the appropriate resource capability information. In the example of FIGS. 10b and 11a, a unique identification is possible, as the local mapping table contains only a single entry for each media type. In case of several media resources attached, or in case of a media resource allowing access to the same media type in different ways (e.g. addressing schemes), the announcement of media types only would not be sufficient. A service identification information is required in these cases.

As an example, FIG. 11b illustrates another embodiment 1110 of a header of a SIP REGISTER message, which may be used to announce the attached services from the local ASI mapping table 1020 from FIG. 10c to an IMS-network. For each ASI in the local mapping table, the SCI and further the LSI are retrieved and inserted into the REGISTER message. Each of the two attached services related to video may specifically be accessed using the LSIs. The association of an SCI with particular LCIs is accomplished by using the format 'SCI=LCI1' or 'SCI=LCI2'. Other embodiments may use another format.

Referring back to FIG. 6, after having created a REGISTER message, the UE 602 (e.g., a user agent of the UE 602) sends the REGISTER message to the network to accomplish registration of the user equipment in the network. The proxy 606 receives the registration message and forwards it to the serving node 608. Here, the service capability information and optional LSIs are extracted from the REGISTER message and stored in a service registration table in association with the personal contact address specified in the REGISTER message. After successful storage in the service registration table, the registration is acknowledged with the SIP-message "200 OK" to the user equipment 602.

FIG. 10d illustrates an embodiment 1030 of a service registration table (more precisely an attached services registration table) stored in an attached service registration server, for example the CSCF 608 in FIG. 6. The table contains the ASIs of the network-registered device 'node1' as they have been provided to the server during the registration process. Each row contains one data record of service registration information, wherein each data record may contain at least a service capability information associated with information for identifying the network-registered device, e.g. an URI or URL of the network-registered device. The attached service registration table may contain further data, e.g., time of refresh or expiry of a registration or control data related to control of the attached service by the network operator or the user of the network-registered device.

As shown in FIG. 6, the user equipment 602 in this embodiment further announces the attached services based on the media resource capabilities to the presence server 610. The essential steps correspond to the steps discussed already with regard to the attached service announcement to the S-CSCF 608. A Publish request message according to the TS 24.841 is prepared and sent via the P-CSCF 606 to the presence server 610. The server 610 extracts the SCI and LSI information and the associated URI from the message and adds appropriate entries to the service registration table. Successful processing is acknowledged to the user equipment 602.

Figure 7:
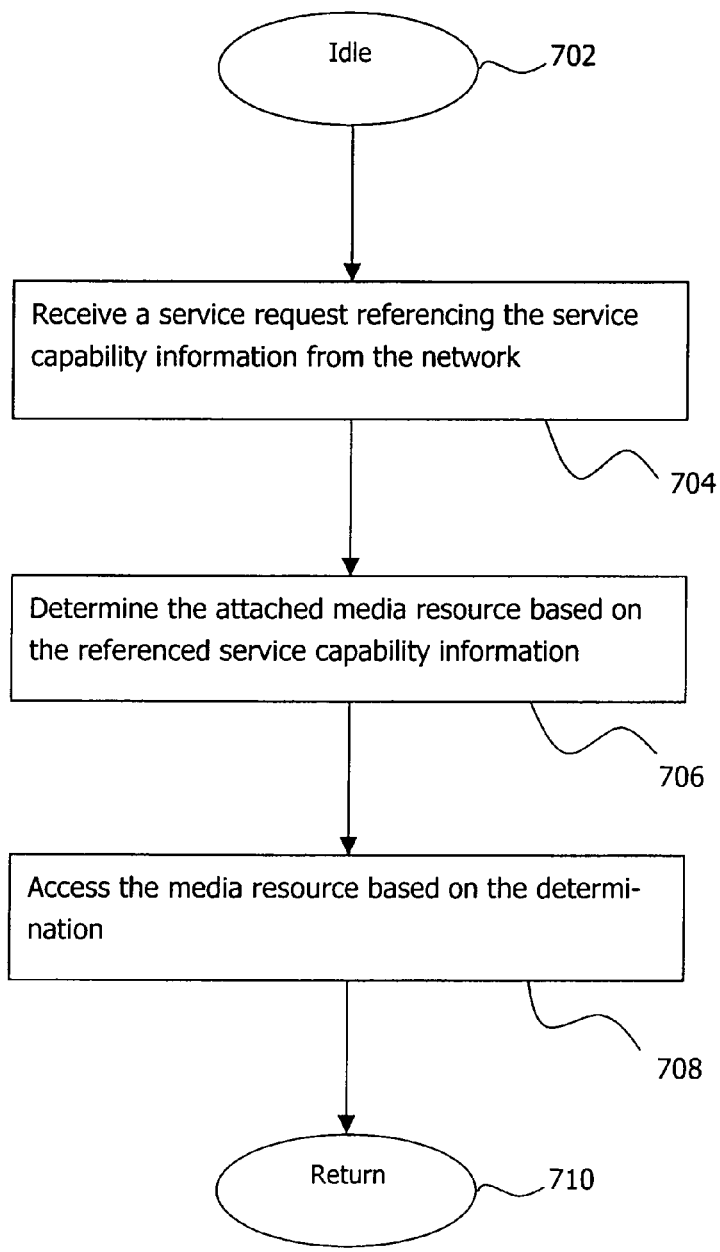
FIG. 7 is a flow chart illustrating an embodiment of a procedure for handling an incoming service request in a network-registered device with a media resource attached.

FIG. 7 is a flow diagram illustrating the essential steps of an embodiment 700 of a procedure for handling an incoming service request in a network-registered device with a media resource attached. The user equipment may be the UE 104 of FIG. 1, the UE 200 of FIG. 2, UE 302 of FIG. 3 or UE 602 of FIG. 6. The procedure 700 will be illustrated with respect to the components of user equipment 200 in FIG. 2.

In step 702 of routine 700, the user equipment is idle. For example, the user agent 206 of UE 200 has been registered in the network 204, thereby announcing the SCI of the attached media resource 202, and now waits for further input. In step 704, a service invocation request referencing the SCI is received from the network. For example, the user agent 206 receives a SIP INVITE message from the network 204 via association 208.

In FIG. 11c, an example embodiment 1120 of a corresponding INVITE message is illustrated. Multiple attached services are requested within a single access request. The message may be based on the ASI data announced with the REGISTER message 1110 of FIG. 11b, which has been discovered by an access-requesting entity. The message 1120 specifies in the accept-contact field 1122 the requested services by indicating the service capability information 'audio' and 'video'. Further, a service identification information, namely a local service identifier 'LSI1' is included for the media type "[sip.]video". Although a local service identifier 'LSI3' may have been announced by the network-registered device for the media type 'audio' also (see FIG. 11b), this LSI may be omitted in the service request, as the requested attached service is uniquely identified already by the indication of the media type 'audio'. The user agent 206 extracts the SCI and the LSI (if present) from the INVITE message and forwards these control data to the gateway 226. The service request may also comprise control parameters for controlling the attached service, which are also extracted and forwarded to the gateway 226.

A service invocation may require transmitting a number of control parameters from the access-requesting entity to the network-registered device. In case a request for an attached service is small enough to fit inside the payload of a SIP message, the request may be sent directly inside a SIP INVITE message (as illustrated in FIG. 11c) or MESSAGE message (the same is true for return values to be sent from the attached service to the access-requesting entity: if the return value fits into a SIP message, then it may be sent, e.g., in a SIP OK message). In case the interaction of the service invoker (the access-requesting entity) with the attached service involves several message exchanges, a SIP session may be established between the invoker and the network-registered device. After the SIP session is established, the invoker may use SIP or any other protocol negotiated during the session establishment for further communication with the network-registered device.

In step 706, the attached media resource is determined based on the referenced service capability information. In the example embodiment of FIG. 2, the gateway component 226 queries the local ASI mapping table 1020 (FIG. 10c) in storage 220 for looking up the SCI and LSI (if present) received from the user agent 206 and retrieves the associated ASD data. For example, the gateway retrieves the appropriate resource addresses (the correct IP-address for media type video and the Bluetooth address for media type audio from the table in FIG. 10c). The gateway further retrieves the resource control information RCI from the local ASI mapping table. In the example of FIG. 10c, the corresponding pointers are retrieved. Possibly further control information is retrieved from the corresponding ASD entry in the local ASI mapping table.

In step 708, the media resource is accessed based on the determination. In the example embodiment shown in FIG. 2, the gateway 226 forwards the determined control information and possibly control parameters extracted from the service request to the resource control application 214. The application 214 then uses the control information and the control parameters to control the attached media resource 202 accordingly. For example, the application may determine from the control information the interface (for example the interface 210 in FIG. 2) to use for proper addressing the referenced resource. Further, the application uses the pointers to access the resource information storage 216 for retrieving resource control information in a resource description format for controlling the resource.

Generally, the gateway 226 may control the media resource 202 in different ways. According to a first possibility, the gateway may forward the received service request without any modification of the content to the attached resource. In this way, the gateway 226 acts as a transparent proxy.

As a second possibility, the gateway 226 may convert the received service invocation request into a request matching the communication framework used to communicate with the attached resource over the interface 210 and the communication link 212. Protocol translations have to be performed by the gateway, but the content related to the service request itself is not changed. For example, only the transport protocols may be adapted to the communication link 212 in FIG. 2. For instance, the communication 208 between user equipment 200 and a network 204 may be based on the IP protocol, whereas the resource 202 may be attached via Bluetooth to the user equipment 200.

As a third possibility, the process of generating media data by the media resource and/or the generated media data itself do not exactly match the service utilized for transporting the media data via the network 204. For example, different codecs may be used, or a required and a provided streaming bandwidth differ. In these cases, the gateway 226 possibly has to convert the media data delivered from the media resource 202. For example, the gateway may be required to decode the data stream and encode it with a different code, or to buffer the media data. Similar functionality may be required for cases where data is delivered to the media resource.

As a still further possibility, when providing the media data of the attached media resource to the network, the gateway may act as an aggregator, i.e. it may combine the media streams of different media resources, for example an audio and video stream for video-telephony. The gateway may also act to provide a particular QoS. The gateway may also act as an aggregator when forwarding several data streams to the media resource.

The procedure 700 may return in step 710 to a higher-level control routine.

Figure 8:
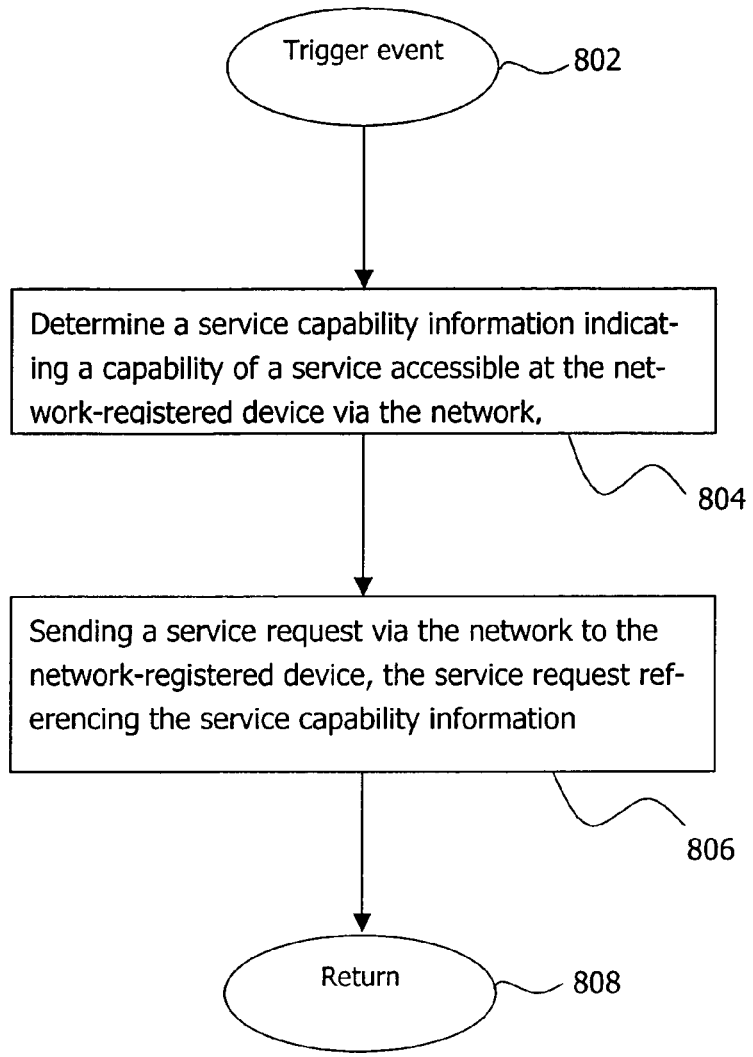
FIG. 8 is a flowchart illustrating an embodiment of a method for providing access of an access-requesting entity via a multimedia-enabled network to a media resource controllably attachable to a network-registered device.

FIG. 8 is a flowchart illustrating an embodiment 800 of a method for providing access of an access-requesting entity via a multimedia-enabled network to a media resource controllably attachable to a network-registered device. The method may be performed by the UE 106 in FIG. 1, UE 304 in FIG. 3, or UE 400 in FIG. 4. The procedure 800 will exemplarily be illustrated with respect to the components of the user equipment 400 in FIG. 4.

The method is triggered in step 802, for example by an event related to the input of a user of the access-requesting entity, with which explicitly or implicitly an access to data resources via the network is requested.

In step 804, a service capability information is determined, the service capability information indicating a capability of a service accessible at the network-registered device via the network, wherein the capability is related to the media resource. The determination may comprise that the access-requesting entity prepares and performs a discovery of an attached service information related to the network-registered device. These steps may, e.g., be performed by a user agent of the network-registered device, although the embodiment of FIG. 4 does not encompass a user agent. In principle, the interface component 402 of the user equipment 400 in FIG. 4 may construct a SIP OPTIONS message and send the message 403 to a SIP attached service registration server in the network 401 (alternatively, the OPTIONS message may be sent directly to the network-registered device with the media resource attached). In response to the SIP OPTIONS message, the service registration server sends a "200 OK" response message, which contains the attached services information as represented in the SIP registry, i.e. the service registration table of the server. The attached service information includes at least the service capability information and optionally local service identifier information. For preparation of the service request, the received SCI (and LSI) may be stored in the access-requesting entity. In the example of FIG. 4, the received data are stored in storage component 404. For multimedia-enabled networks other than IMS-networks or networks not relying on the SIP-framework for service control, the determination step will of course differ from the examples discussed here.

In step 806, a service request is sent via the network to the network-registered device, the service request referencing the service capability information. For example, within a SIP-framework, the user agent of the access-requesting entity may send a SIP INVITE message via the network to the user agent of the network-registered device. The service request references the service capability information, optionally a service identifier information, and may contain additional control parameters.

For preparation of the multimedia service request, the received SCI (and SII/LSI) may for example be presented to the user to let him choose at least one of the attached services. The discovered services may include both media services based on components integrated in the network-registered device and services mediated by the network-registered device and based on the attached media resource/s. For clarity the discussion concentrates on the attached services only.

After at least one of the attached services has been determined, the second interface 406 of the user equipment 400 (see FIG. 4) may prepare and send a service request, namely a SIP INVITE message. The message may include the discovered service capability information and optionally the discovered local service information. Further steps not shown in FIG. 8 may be required to establish a SIP session between the user agents of the access-requesting entity and the network-registered device. Media data may then be transmitted from the media resource via the network-registered device and the network to the access-requesting entity. Eventually, in step 808, a media data transmission may be finished, the SIP session (if any) may be torn down and control may be returned to a superior control procedure.

Figure 9:
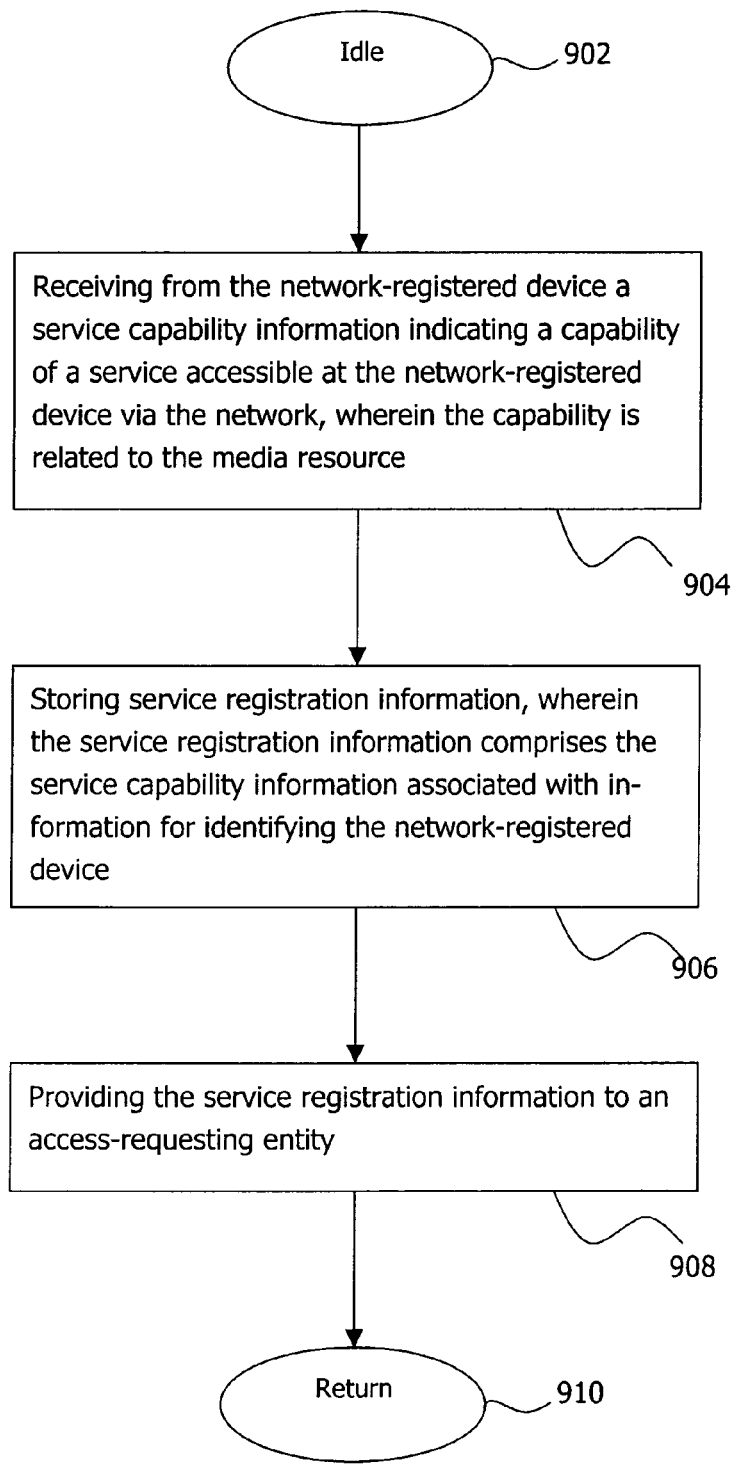
FIG. 9 is a flowchart illustrating an embodiment of a method for providing access from a multimedia-enabled network to a media resource, wherein the media resources is controllably attachable to a network-registered device.

FIG. 9 is a flowchart illustrating an embodiment 900 of a method for providing access from a multimedia-enabled network to a media resource, wherein the media resources is controllably attachable to a network-registered device. The procedure 900 will exemplarily be illustrated with respect to the components of the attached service registration server 300 in FIG. 3.

In step 902, the server, which may be the service registration server 300 of FIG. 3 or 108 of FIG. 1, is ready for processing requests. In step 904, the server receives from the network-registered device a service capability information indicating a capability of a service accessible at the network-registered device via the network, wherein the capability is related to the media resource. Examples for messages transporting service capability information are illustrated in FIGS. 11*a*, 11*b*.

The service capability information is extracted from the received message. In step 906, service registration information is stored, wherein the service registration information comprises the service capability information associated with information for identifying the network-registered device. The information may be stored in a service registration table (reference numeral 307 in FIG. 3).

In step 908, the service registration information is provided to an access-requesting entity. This step may include, for example in an IMS-network utilizing SIP, to receive a SIP OPTIONS message from an access-requesting entity, which is directed towards discovering the capabilities related to the network-registered device. In a 200 OK message in response to the OPTIONS message, the stored attached services information may then be sent to the querying entity. In further steps of the procedure 900 which are not shown in FIG. 9, the server may act as an intelligent routing device for routing a service request received from the access-requesting entity 304 to the network-registered device 302. In step 910, the procedure 900 returns into the idle state.

Registration, discovery and invocation of attached services may be controlled by operators and/or users. As an example, the registration of attached services may be restricted by the operator according to rules specifying subscribers, subscriber groups, terminals or terminal types. Policies of the network operator, for example QoS rules, may also be applied to the processing of invocation requests for registered attached services. A user of a network-registered device may control access to the attached service on reception of each particular service request or based on rules stored in the network-registered device. The rules may be based, for example, on an identity of the user invoking the service, the type of attached service, etc.

The invention allows to access attached services of a network-registered device via a multimedia-enabled network from an access-requesting entity, enhancing the applicability of multimedia networks. Use cases include access to locally attached media resources, the attachment be based on arbitrary communication technologies. Other use cases may comprise access to services hosted by other platforms, e.g. remote service platforms. For example, an IMS application server may have a further non-IMS application server attached to it: The invention then allows to access the non-IMS server via an IMS network. A network operator may control discovery and invocation of attached services, which are not accessible without the invention from within the multimedia-enabled network.

While the current invention has been described in relation to its preferred embodiments, it is to be understood, that this disclosure is only illustrative. Accordingly, it is intended that the invention be limited only by the scope of the claims appended hereto.

The invention claimed is:

1. A method performed by a network-registered device for providing an access-requesting device with access via a multimedia-enabled network to a media resource located external to the network-registered device and controllably attached thereto, wherein the method comprises the following steps:
   determining resource capability information indicating a capability of the attached external media resource;
   transforming the resource capability information of the attached external media resource into service capability information indicating a capability related to a service accessible at the network-registered device via the network, said transforming step including:
      providing a mapping table configured to map the resource capability information to the service capability information; and
      determining the service capability information based on the mapping table;
   providing the service capability information to at least one of the network and the access-requesting device, wherein the network-registered device comprises at least one user agent, wherein the at least one user agent is configured to:
      handle the service accessible at the network-registered device; and
      send the service capability information to the network or access-requesting device in a header of a network message during a registration procedure of the user agent in the network;
   receiving from the access-requesting device via the network, a service request referencing the service capability information, wherein any of the at least one user agent, in response to receiving the service request, initiates establishment of the service accessible at the network-registered device;
   determining the attached external media resource based on the referenced service capability information received in the service request;
   accessing the determined attached external media resource;
   receiving media data generated by the media resource;
   aggregating the media data of the media resource with media data of further sources when connected; and
   forwarding the media data to the network.

2. The method according to claim 1, wherein in the step of determining the resource capability information, the resource capability information conforms to a resource description format related to the attached external media resource; and in the step of transforming the resource capability information into the service capability information, the service capability information conforms to a service description format of the network.

3. The method according to claim 1, wherein the step of sending the service capability information to the network comprises the step of sending service identification information to the network, the service identification information uniquely identifying the resource capability information which is associated with the service capability information in the network registered device.

4. The method according to claim 1, wherein the step of receiving the service request comprises the steps of:
deciding on the service request based on decision rules; and
providing the service based on the decision.

5. A method performed by a service registration server of a multimedia-enabled network for providing an access-requesting device with access via the multimedia-enabled network to a media resource located external to a network-registered device and controllably attached thereto, wherein the method comprises the following steps:
receiving from at least one user agent at the network-registered device, service capability information indicating a capability of a service accessible at the network-registered device via the network, wherein the service capability information has been generated by the network-registered device by transforming resource capability information of the attached external media resource into the service capability information utilizing a mapping table, wherein the service capability information is received in a header of a network message during a registration procedure of the user agent in the network;
storing service registration information, wherein the service registration information comprises the service capability information and associated information for identifying the network-registered device;
providing the service registration information to the access-requesting device;
routing a service request from the access-requesting device toward the network-registered device based on the service registration information, the service request including the service capability information, which enables the network-registered device to identify and access the attached external media resource, receive media data generated by the attached external media resource, and forward the media data to the network;
receiving a service initiation request from the network-registered device for the service accessible at the network registered device; and
establishing the service accessible at the network registered device;
wherein when further media resources are connected to the network-registered device, the service registration server receives aggregated media data from the network-registered device, the aggregated media data comprising the media data generated by the attached external media resource and media data from the further media sources.

6. The method according to claim 5, wherein the step of receiving the service capability information comprises the steps of:
receiving service identification information from the network-registered device, the service identification information uniquely identifying resource capability information which is associated with the service capability information in the network-registered device; and
storing the service identification information associated with the service capability information in the service registration information.

7. A network-registered device for providing an access-requesting device with access via a multimedia-enabled network to a media resource located external to the network-registered device and controllably attached thereto, wherein the network-registered device comprises:
a determination component configured to determine resource capability information indicating a capability of the attached external media resource;
a transformation component configured to transform the resource capability information of the attached external media resource into service capability information indicating a capability related to a service accessible at the network-registered device via the network, wherein the transformation component is configured to:
provide a mapping table configured to map the resource capability information to the service capability information; and
determine the service capability information based on the mapping table;
a user agent configured to:
provide the service capability information to the access-requesting device via the network, wherein the user agent sends the service capability information to the network in a header of a network message during a registration procedure of the user agent in the network;
receive from the access-requesting device, a service request referencing the service capability information; and
initiate establishment of the service accessible at the network-registered device in response to receiving the service request;
a gateway component configured to determine the attached external media resource based on the referenced service capability information received in the service request; and
a resource control component configured to access the determined attached external media resource via the gateway component;
wherein the gateway component is configured to:
receive media data generated by the media resource;
aggregate the media data of the media resource with media data of further sources when connected; and
forward the media data to the network.

8. A service registration server of a multimedia enabled network, for providing an access-requesting device with access to a media resource located external to a network-registered device and controllably attached to the network-registered device, wherein the service registration server comprises:
a first interface component configured to receive from at least one user agent at the network-registered device, service capability information indicating a capability of a service accessible at the network-registered device via the network, wherein the service capability information has been generated by the network-registered device by transforming resource capability information of the attached external media resource into the service capability information utilizing a mapping table, wherein the service capability information is received in a header of a network message during a registration procedure of the user agent in the network;
a storage component configured to store service registration information, wherein the service registration information comprises the service capability information and information for identifying the network-registered device;
a second interface component configured to send the service registration information to the access-requesting device; and
a routing component configured to route a service request from the access-requesting device toward the network-registered device based on the service registration information, the service request including the service capability information, which enables the network-registered device to identify and access the attached external media resource, receive media data generated by the attached external media resource, and forward the media data to the network;

wherein the first interface component is further configured to receive a service initiation request from the network-registered device for the service accessible at the network registered device; and wherein the service registration server is configured to establish the service accessible at the network registered device;

wherein when further media resources are connected to the network-registered device, the service registration server is configured to receive aggregated media data from the network-registered device, the aggregated media data comprising the media data generated by the attached external media resource and media data from the further media sources.

* * * * *